United States Patent [19]
Fayolle et al.

[11] Patent Number: 5,724,215
[45] Date of Patent: Mar. 3, 1998

[54] ROTARY TRANSFORMER ARRANGEMENT FOR A MAGNETIC TAPE SYSTEM DRUM ASSEMBLY

[75] Inventors: Bruno Fayolle, Lezinnes; Dominique Besnard, Auxerre; Emmanuel Ribiollet, Chauvry; Alain Leclaire, Héry, all of France

[73] Assignee: Societe Tonnerroise d'Electronique Industrielle S.A., France

[21] Appl. No.: 832,133

[22] Filed: Apr. 3, 1997

Related U.S. Application Data

[63] Continuation of Ser. No. 396,393, Feb. 28, 1995, abandoned.

[30] Foreign Application Priority Data

Mar. 1, 1994 [FR] France .................. 94 02331

[51] Int. Cl.$^6$ .................................................. G11B 5/52
[52] U.S. Cl. ............................ 360/108; 360/130.24
[58] Field of Search .................... 360/84, 108, 130.24

[56] References Cited

U.S. PATENT DOCUMENTS

| | | | |
|---|---|---|---|
| 4,654,738 | 3/1987 | Kato et al. ............... | 360/130.24 |
| 5,278,715 | 1/1994 | Willmann et al. ............... | 360/108 |
| 5,299,085 | 3/1994 | Sawai et al. ............... | 360/108 |

FOREIGN PATENT DOCUMENTS

| | | | |
|---|---|---|---|
| 59-178601 | 10/1984 | Japan ............... | 360/108 |
| 60-195701 | 10/1985 | Japan ............... | 360/108 |
| 1-264625 | 10/1989 | Japan ............... | 360/130.24 |
| 5-12603 | 1/1993 | Japan ............... | 360/130.24 |

*Primary Examiner*—Jefferson Evans
*Attorney, Agent, or Firm*—Joseph S. Tripoli; Frederick A. Wein

[57] ABSTRACT

A drum assembly for a magnetic tape reading and writing system, comprises: a static drum; a rotary spindle coaxial with the static drum and connected to a drive motor; a rotary drum mounted on the spindle; at least one pair of read heads for video and a pair of read heads for audio, each of the read heads rigidly attached to the rotary drum; a first rotary transformer mounted inside the rotary drum, on the rotary spindle, and connected to one of the pairs of read heads; and, a second rotary transformer mounted outside the rotary drum, on the rotary spindle, and connected to the other one of the pairs of read heads.

3 Claims, 1 Drawing Sheet

ROTARY TRANSFORMER ARRANGEMENT FOR A MAGNETIC TAPE SYSTEM DRUM ASSEMBLY

This is a continuation of application Ser. No. 08/396,393, filed Feb. 28, 1995, now abandoned.

BACKGROUND OF THE INVENTION

1. Field of the Invention

The invention concerns magnetic tape reading and writing systems, such as video tape recorders, camcorders and similar systems. It particularly concerns the drum assembly used in such systems.

2. Description of Related Art

In known systems for writing or reading of magnetic tapes, the tape passes over a drum assembly, often referred to only as a drum, which guides the tape during writing or reading of audio and/or video information. In the prior art, the drum comprises two parts: a fixed or static drum, also known as the "lower drum", and a rotary drum known as the "upper drum". The function of the static drum is to is guide the magnetic tape around the drum. The rotary or upper drum is mounted on a rotary spindle linked to a drive motor; it carries the read heads (2, 3, 4 or 6 heads, depending on the model), plus two audio heads, and one or two erasing heads in the case of high fidelity models. The read heads are rigidly attached to the rotary drum so that they rotate at the same speed as the drum. Moreover, currently available drums include a rotary transformer mounted inside the drum. In known configurations, the rotary transformer comprises a rotor part fixed to the rotary drum near the read heads and a stator part fixed inside the static drum and connected to an amplifier which amplifies the video and/or audio signals produced in the various read heads.

The drums currently used in the best writing and reading systems have a number of disadvantages. The rotary transformers used are relatively large and costly to fabricate, since they must be able to transfer the signals produced by the read heads. Moreover, interference or "cross-talk" problems are observed due to the use of a single rotary transformer.

SUMMARY OF THE INVENTION

The present invention concerns a new type of drum assembly which overcomes these disadvantages.

Another advantage of the invention is that it enables reduction of the cost of drum assembly for top-of-the range models by utilizing parts used in cheaper models, notably the drums of 2 and 4 head models without an audio read head.

These and other advantages are achieved by a drum assembly for a magnetic reading and writing system in accordance with an inventive arrangement, comprising: a static drum; a rotary spindle coaxial with the static drum and connected to a drive motor; a rotary drum mounted on the spindle; at least one pair of read heads for video and a pair of read heads for audio, each of the read heads rigidly attached to the rotary drum; a first rotary transformer mounted inside the rotary drum, on the rotary spindle, and connected to one of the pairs of read heads; and, a second rotary transformer mounted outside the rotary drum, on the rotary spindle, and connected to the other one of the pairs of read heads.

According to a special embodiment, the first transformer includes a rotor part fixed to the rotary drum near to the read heads and a stator part located inside the static drum and connected to an amplifier. The amplifier is preferably mounted inside the status drum. The amplifier is advantageously attached to the face of the stator part of the transformer opposite to the one facing the rotor part of the transformer. This arrangement enables better detection of the signals from the read heads, which are weak signals of very low amplitude fed directly to the input of the amplifier without the use of a long wire.

Furthermore, the second rotary transformer includes a rotor part attached to the outside of the rotary drum in such a way as to pick up signals from the read heads, and a stator part connected via a rigid means to the static drum, the stator being connected to an amplifier. In this case, the rotor part is connected to the audio or video heads via a connection system passing through the rotary drum.

In one embodiment, the rigid means of connection comprises a bracket fixed to the face of the static drum or to the drum support. The bracket can be equipped with a means for adjusting the air gap between the rotor part and the stator part of the second rotary transformer.

In a second embodiment, the rigid means of connection comprises a mechanical assembly equipped with a screening part, this assembly being connected to the bracket. In this case, the mechanical assembly is mounted on the rotating spindle in order to enable adjustment of the air gap between the rotor part and the stator part of the second rotary transformer. Also in this case, the amplifier associated with the second rotary transformer is mounted on the mechanical assembly.

DETAILED DESCRIPTION OF THE PREFERRED EMBODIMENTS

Figure 1:
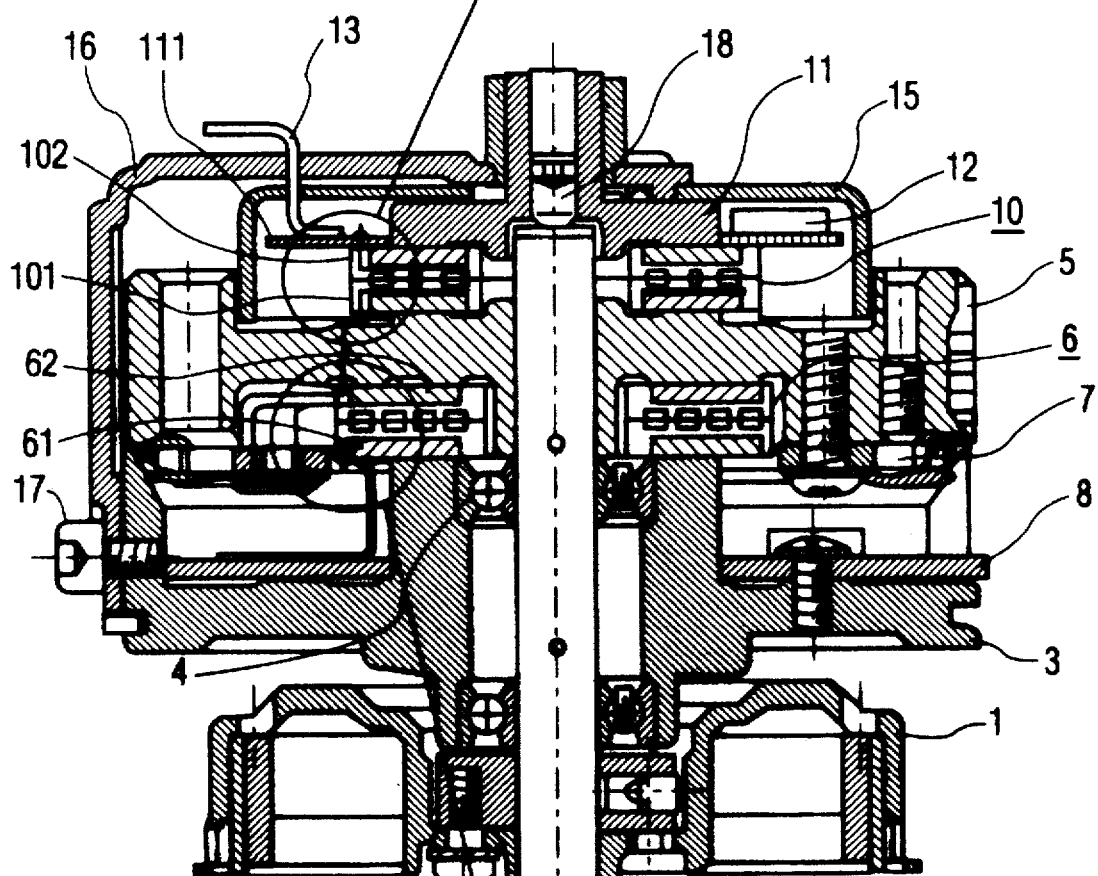
FIG. 1 is an axial section view of a drum assembly according to the invention.

FIG. 1 shows a drum assembly for a high quality read/write system for magnetic tapes, for example a drum for a video tape recorder with 4 video heads, and 2 audio heads for high fidelity sound.

As shown in FIG. 1, the drum assembly is mounted in a conventional way on a rotary spindle 2, rotatably driven by a motor of which only the rotor 1 is shown in the drawing. The drum assembly includes a static drum 3, also referred to as a "lower drum", which is not rotated. It is therefore mounted around the spindle 2 with bearings or the like, such as ball bearings 4 in the embodiment shown. Above this lower drum is a rotary drum 5, also referred to as an "upper drum", mounted on the spindle 2 so that it is rotated by the spindle above the lower drum 3. In an opening between the lower drum 3 and the upper drum 5, there is a first rotary transformer 6 which is preferably fabricated using mini rotary transformer technology, in accordance with which its diameter is significantly less than the diameter of the lower and upper drums. The rotary transformer 6 comprises a stator part 61 fixed to the lower drum 3 and a rotor part 62 fixed to the upper drum 5 and consequently rotating with it. The upper drum 5 carries the video and audio read heads 7.

As noted, the upper drum 5 carries 4 video read heads and two audio read heads for high fidelity sound.

Figure 2:
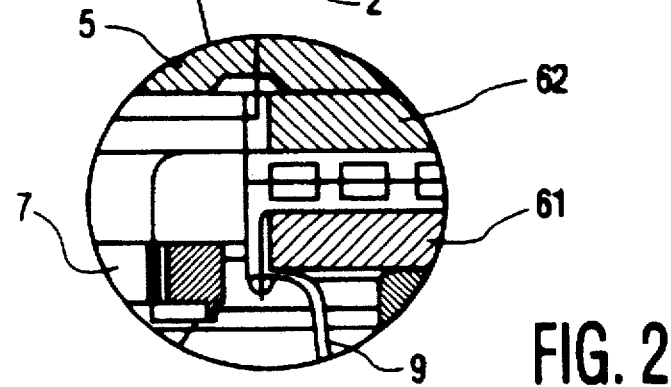
FIG. 2 is an enlarged sectional view showing the connections between the first rotary transformer and the associated read heads and rotary amplifier.

Furthermore in the embodiment shown, the amplifier is mounted within the lower drum 3, so as to be as close as possible to the stator part 61 of the first transformer, in order to reduce the losses in the signals from the transformer. The connection between the stator part 61 and the printed circuit on which the amplifier 8 is mounted is made using a known connection system 9 shown in the enlarged drawing in FIG. 2. Similarly, FIG. 2 shows that the rotor 62 of the rotary transformer 6 is placed within the upper drum 5 close to the read heads so as to reduce the length of the connection between this transformer and the read head whose signals it receives. In the case of FIG. 2, for example, only the four video heads 7 are connected to the stator 62 of the rotary transformer 6 mounted inside the drum.

According to the present invention, the signals from the audio read heads are detected by another rotary transformer mounted on the spindle 2, but outside the drum. This type of arrangement has a number of advantages. In particular, the audio signals can be physically separated from the video signals at the transformer level, which reduces the problems of "crosstalk". The signal amplifiers are also separated to reduce problems of interference between video and audio signals. Moreover, mini-transformers can be uses, as shown, which are significantly less expensive than the large transformer normally used in this type of high quality system. The parts described above can also be used in simpler models such as those with two, three or four video heads and no audio heads. Such use of common parts in both top-of-the-range and less expensive models reduces the overall cost of all of the machines.

According to the present invention, the audio signals are detected by means of a second rotary transformer 10 that incudes a rotor part 101, fixed to the upper part of the rotary drum 5 and therefore rotating with it at the same speed as this drum, and a stator part 102 fixed to the mechanical assembly linked to the lower drum 3 as described below.

According to the embodiment shown in FIG. 1, the mechanical assembly is constituted by a metal T-piece 11 which is mounted above the spindle 2 but is not rotated by it. The stator 12 is mounted on the lower part of the T-piece 11. An outward extension around the edge of the T-piece 11 is formed by an annular disk 111, on which a printed circuit including the amplifier 12 can be mounted. The signals from the amplifier are fed to external signal processing circuits via a connection system 13. The rotor 101 is connected to the audio heads 7 via a slot 5' in the upper part of the rotary drum 5.

Figure 3:
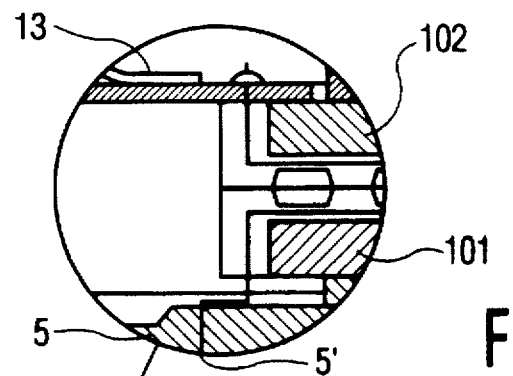
FIG. 3 is an enlarged sectional view showing the connections between the second rotary transformer and its read heads and the rotary amplifier.

The two connection systems described above are shown enlarged in FIG. 3.

In the embodiment shown, the T-piece 11 is attached to the metal part 15, which is in the form of a shallow cup and functions to provide screening for the rotary transformer 10. The assembly formed by the T-piece 11 and the screening cup 15 is held in position above the spindle 2 by means of a bracket 16, whose lower end is fixed to the lower drum 3 using any known means 17, such as screws or rivets. The stator 102, the T-piece 11, the metal part 15 and the bracket 16 are fixed, as shown, with respect to the lower drum 3. To enable an adjustment of the air gap between the rotor part 101 and the stator part 102 of the second rotary transformer, the position of the T-piece 11 supporting the stator part 102 can be adjusted vertically by means of a screw-type system 18. Other means of adjustment could also be used, for example, the height of the bracket 16 could be adjusted using a slider type system with locking means.

In the embodiment described above, the video heads are connected to the first rotary transformer whereas the audio heads are connected to the second rotary transformer. However, it will be clear to those skilled in the art that an inversion of these connections can be made while remaining within the framework of the invention. Moreover, a system can be envisioned in accordance with the invention in which the amplifier mounted inside the drum is fixed directly to the stator part of the rotary transformer on the side which is not facing the rotor part of this rotary transformer. Other variants can also be envisioned while remaining within the framework of the invention.

What is claimed is:

1. A drum assembly for a magnetic tape reading and writing system comprising:

a static drum;

a rotary spindle coaxial with said static drum and connected to a drive motor;

a rotary drum mounted on said spindle, said rotary drum having an upper and a lower face;

a set of two audio magnetic heads and a set of four video magnetic heads, each of said magnetic heads being rigidly attached to said rotary drum;

a first rotary transformer having a rotor part mounted on a lower face of said rotary drum and coupled to one of the set of heads;

a first stator part disposed inside said static drum and connected to a first amplifier housed inside said static drum;

a second rotary transformer having a rotor part mounted on the upper face of said rotary drum and coupled to the other set of magnetic heads, and a second stator part mounted on a mechanical assembly rigidly attached to a bracket fixed on said static drum, said stator part of said second rotary transformer being connected to a second amplifier mounted on said mechanical assembly.

2. A drum assembly according to claim 1 wherein the mechanical assembly comprises a T piece mounted on top of said spindle whose position can be adjusted by means of a screw in order to adjust an air gap between the rotor part and the stator part of the second rotary transformer.

3. A drum assembly according to claim 1 wherein said bracket comprises means for adjusting an air gap between said rotor and stator part of said second rotary transformer.

* * * * *